(12) United States Patent
Seth et al.

(10) Patent No.: US 10,706,076 B2
(45) Date of Patent: Jul. 7, 2020

(54) METHOD AND SYSTEM TO CATEGORIZE ITEMS AUTOMATICALLY

(71) Applicant: eBay Inc., San Jose, CA (US)

(72) Inventors: Shashi Seth, Foster City, CA (US); Brian Scott Johnson, Campbell, CA (US); Robin Kennedy, Scotts Valley, CA (US); Niraj Kothari, Milpitas, CA (US)

(73) Assignee: eBay Inc., San Jose, CA (US)

( * ) Notice: Subject to any disclaimer, the term of this patent is extended or adjusted under 35 U.S.C. 154(b) by 447 days.

(21) Appl. No.: 15/478,554

(22) Filed: Apr. 4, 2017

(65) Prior Publication Data

US 2017/0206267 A1  Jul. 20, 2017

Related U.S. Application Data

(63) Continuation of application No. 14/556,926, filed on Dec. 1, 2014, now Pat. No. 9,639,599, which is a
(Continued)

(51) Int. Cl.
| | |
|---|---|
| *G06F 16/00* | (2019.01) |
| *G06F 16/28* | (2019.01) |
| *G06F 16/21* | (2019.01) |
| *G06F 16/22* | (2019.01) |
| *G06F 16/24* | (2019.01) |
| *G06F 16/25* | (2019.01) |

(Continued)

(52) U.S. Cl.
CPC ............ *G06F 16/285* (2019.01); *G06F 16/21* (2019.01); *G06F 16/22* (2019.01); *G06F 16/24* (2019.01); *G06F 16/254* (2019.01); *G06F 16/258* (2019.01); *G06F 16/282* (2019.01); *G06Q 20/102* (2013.01); *G06Q 30/02* (2013.01); *G06Q 30/08* (2013.01)

(58) Field of Classification Search
CPC ..................................................... G06F 16/285
See application file for complete search history.

(56) References Cited

U.S. PATENT DOCUMENTS

| | | | |
|---|---|---|---|
| 5,721,832 | A | 2/1998 | Westrope |
| 6,490,567 | B1 | 12/2002 | Gregory |

(Continued)

OTHER PUBLICATIONS

"U.S. Appl. No. 10/977,279, Advisory Action dated Sep. 24, 2013", 3 pgs.

(Continued)

*Primary Examiner* — Grace Park
(74) *Attorney, Agent, or Firm* — Holland & Hart LLP

(57) ABSTRACT

A method and system to automatically categorize a merchant listing in an electronic marketplace are provided. The method includes parsing the category information submitted by a seller to derive a first category identifier. A first search is performed to locate the first category identifier in a first database containing a listing of category identifiers. If no match is found, the first category identifier is identified as expired or invalid. A second search is performed on a second database that includes mapping information of an expired category identifier to a new category identifier. If a match is found, the first category identifier is assigned as the new category identifier, thereby enabling the listing to be listed in the updated category automatically.

18 Claims, 6 Drawing Sheets

Related U.S. Application Data continuation of application No. 10/977,279, filed on Oct. 29, 2004, now Pat. No. 8,903,827.

(51) Int. Cl.
  *G06Q 20/10* (2012.01)
  *G06Q 30/08* (2012.01)
  *G06Q 30/02* (2012.01)

(56) References Cited

U.S. PATENT DOCUMENTS

| | | | |
|---|---|---|---|
| 7,818,209 B1 * | 10/2010 | Lu | G06Q 30/02 705/14.13 |
| 8,903,827 B2 | 12/2014 | Seth et al. | |
| 9,639,599 B2 | 5/2017 | Seth et al. | |
| 2003/0120662 A1 | 6/2003 | Vishik | |
| 2003/0236791 A1 * | 12/2003 | Wilmsen | G06Q 30/06 |
| 2006/0095370 A1 | 5/2006 | Seth et al. | |
| 2006/0095937 A1 * | 5/2006 | Knudson | G06F 3/0482 725/45 |
| 2006/0173755 A1 | 8/2006 | Mihara | |
| 2007/0282831 A1 * | 12/2007 | Anderson | G06F 16/48 |
| 2015/0088895 A1 | 3/2015 | Seth et al. | |

OTHER PUBLICATIONS

"U.S. Appl. No. 10/977,279, Advisory Action dated Oct. 27, 2008", 3 pgs.
"U.S. Appl. No. 10/977,279, Appeal Brief filed Dec. 8, 2008", 34 pgs.
"U.S. Appl. No. 10/977,279, Appeal Decision dated Dec. 19, 2011", 6 pgs.
"U.S. Appl. No. 10/977,279, Decision on Pre-Appeal Brief Request dated Nov. 4, 2013", 2 pgs.
"U.S. Appl. No. 10/977,279, Examiner Interview Summary dated Feb. 21, 2013", 3 pgs.
"U.S. Appl. No. 10/977,279, Examiner Interview Summary dated Oct. 31, 2013", 2 pgs.
"U.S. Appl. No. 10/977,279, Examiner's Answer to Appeal Brief dated Mar. 16, 2009", 24 pgs.
"U.S. Appl. No. 10/977,279, Final Office Action dated Jun. 12, 2014", 28 pgs.
"U.S. Appl. No. 10/977,279, Final Office Action dated Jun. 13, 2013", 26 pgs.
"U.S. Appl. No. 10/977,279, Final Office Action dated Aug. 12, 2008", FOAR, 25 pgs.
"U.S. Appl. No. 10/977,279, Final Office Action dated Oct. 15, 2012", 23 pgs.
"U.S. Appl. No. 10/977,279, Non Final Office Action dated Jan. 21, 2014", 28 pgs.
"U.S. Appl. No. 10/977,279, Non Final Office Action dated Feb. 21, 2013", 23 pgs.
"U.S. Appl. No. 10/977,279, Non Final Office Action dated Jun. 4, 2007", 20 pgs.
"U.S. Appl. No. 10/977,279, Non Final Office Action dated Jun. 18, 2012", 23 pgs.
"U.S. Appl. No. 10/977,279, Non-Final Office Action dated Jan. 3, 2008", OARN', 25 pgs.
"U.S. Appl. No. 10/977,279, Notice of Allowance dated Jul. 29, 2014", 10 pgs.
"U.S. Appl. No. 10/977,279, Pre-Appeal Brief Request filed Oct. 23, 2013", 5 pgs.
"U.S. Appl. No. 10/977,279, Response filed May 5, 2008 to Non Final Office Action dated Jan. 3, 2008", 18 pgs.
"U.S. Appl. No. 10/977,279, Response filed May 21, 2013 to Non Final Office Action dated Feb. 21, 2013", 21 pgs.
"U.S. Appl. No. 10/977,279, Response filed May 21, 2014 to Non Final Office Action dated Jan. 21, 2014", 20 pgs.
"U.S. Appl. No. 10/977,279, Response filed Jul. 8, 2014 to Final Office Action dated Jun. 12, 2014", 22 pgs.
"U.S. Appl. No. 10/977,279, Response filed Sep. 18, 2012 to Non-Final Office Action dated Jun. 18, 2012", 20 pgs.
"U.S. Appl. No. 10/977,279, Response filed Sep. 25, 2007 to Non Final Office Action dated Jun. 4, 2007", 6 pgs.
"U.S. Appl. No. 10/977,279, Response filed Sep. 12, 2012 to Final Office Aciton dated Jun. 13, 2013", 21 pgs.
"U.S. Appl. No. 10/977,279, Response filed Oct. 14, 2008 to Final Office Action dated Aug. 12, 2008", 17 pgs.
"U.S. Appl. No. 10/977,279, Response filed Dec. 11, 2012 to Final Office Action dated Oct. 15, 2012", 20 pgs.
"U.S. Appl. No. 14/556,926, Response filed Apr. 18, 2016 to Pre-Interview Communication dated Feb. 17, 2016", 7 pgs.
"U.S. Appl. No. 14/556,926, Examiner Interview Summary dated May 4, 2016", 2 pgs.
"U.S. Appl. No. 14/556,926, Final Office Action dated Sep. 6, 2016", 9 pgs.
"U.S. Appl. No. 14/556,926, First Action Interview dated May 4, 2016", 5 pgs.
"U.S. Appl. No. 14/556,926, Notice of Allowance dated Dec. 27, 2016", 6 pgs.
"U.S. Appl. No. 14/556,926, Preliminary Amendment filed Feb. 26, 2015", 10 pgs.
"Application U.S. Appl. No. 14/556,926, Response filed Nov. 4, 2016 to Final Office Action dated Sep. 6, 2016", 9 pgs.
"U.S. Appl. No. 14/556,926, Response to First Action Interview filed on Aug. 4, 2016 to First Action Interview dated May 4, 2016", 15 pgs.
Bergamaschi, et al., "Product Classification Integration for E-commerce", Proceedings of the 13th International Workshop on Database and Expert Systems Applications, (2002).
Cheng, et al., "Hierarchical Classification of Documents with Error Control", PAKDD 2001, LNAI 2035, (2001), 433-443.
Ding, et al., "Golden Bullet: automated classification of product data in E-commerce", Proceedings of Business Information Systems, Poznan Poland, (2002), 9 pages.
Fensel, Dieter, et al,, "Product Data Integration in B2B E-Commerce", IEEE Intelligent Systems, vol. 16, (2001), 54-59.

\* cited by examiner

| DATE | CATEGORY LISTING AT MARKET PLACE | CATEGORY LISTING DATABASE 96 | CATEGORY RELATION DATABASE 98 | |
|---|---|---|---|---|
| JANUARY 2004 | A, B, C, D | A, B, C, D | NONE | — 132 |
| FEBRUARY 2004 | B, C, D (A MERGED WITH B) | B, C, D | A - B | — 134 |
| MARCH 2004 | C, D (B MERGED WITH C) | C, D | A - C<br>B - C | — 136 |
| APRIL 2004 | A, C, D (A ADDED TO LIST) | A, C, D | B - C | — 138 |
| MAY 2004 | Z, C, D (RENAME A AS Z) | Z, C, D | B - C<br>A - Z | — 140 |

FIGURE 5

METHOD AND SYSTEM TO CATEGORIZE ITEMS AUTOMATICALLY

CLAIM OF PRIORITY

This application is a continuation of and claims the benefit of priority of U.S. application Ser. No. 14/556,926, filed Dec. 1, 2014, which claims the benefit of priority of U.S. application Ser. No. 10/977,279, filed Oct. 29, 2004, each of which is hereby incorporated by reference in its entirety.

FIELD OF THE INVENTION

An embodiment of the present invention relates generally to the field of online commerce and more particularly, to a method and a system for categorizing merchant items in an electronic marketplace, e.g., online trading environment, online shopping site, online auctioning site or online person-to-person trading site.

BACKGROUND OF THE INVENTION

The Internet and the World Wide Web ("Web") have changed the landscape of information delivery and affected numerous aspects of life, including commerce and entertainment. One area that has benefited from this technology development is the ability of individuals to buy and sell items within an electronic marketplace.

Many service providers operate auctions and other selling mechanisms on servers connected to the users over one or more networks, typically including the Internet. The users selling items over these networks vary from single users to large corporations, such as Walt Disney Corporation and International Business Machines Corporation. Some users retail their products and services not only through their own electronic marketplace but also by leveraging third-party electronic marketplaces, such as an auction site.

To enhance the buying and selling experience in the electronic marketplace, a service provider of such a marketplace may provide many applications to facilitate the ease of doing business in the marketplace. One such application may be a category listing application that allows the sellers to conveniently classify their products and services in a specific location of the marketplace. This classification in turn facilitates buyers searching for specific goods or services. Examples of the categories available in a marketplace include books, coins, music, home and garden, toys and hobbies, tickets and consumer electronics.

However, it is challenging for a user to individually categorize a wide range of merchandise in large quantity. For example, Walt Disney Corporation retails toys, apparels, collectables, theme park tickets and vacation services, where each of these items are listed in different categories.

In addition, due to business needs, the service provider of the marketplace may need to make changes to the categories. For example, the service provider may merge one category with another, add a new category, rename an existing category or delete a category. The user needs to be constantly informed of the changes in order to list an item in the right category.

SUMMARY OF THE INVENTION

According to one aspect of the invention, there is provided a method to categorize a merchant listing automatically. In one embodiment, this method includes identifying a first category identifier of the merchant listing; performing a first search to compare the first category identifier with a plurality of category identifiers in a first database; performing a second search to compare the first category identifier with a plurality of category relationships in a second database in response to no match being found in the first search; providing a second category identifier of the merchant in response to a match being found in the second search; and assigning the second category identifier to the first category identifier.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 5 is a block diagram representing data information in the databases of the category system, according to one exemplary embodiment of the present invention.

DETAILED DESCRIPTION

A method and system to categorize an item in an electronic market place are described. In the following description, for purposes of explanation, numerous specific details are set forth in order to provide a thorough understanding of the present invention, it will be evident, however, to one skilled in the art that the present invention may be practiced without these specific details.

Platform Architecture

Figure 1:
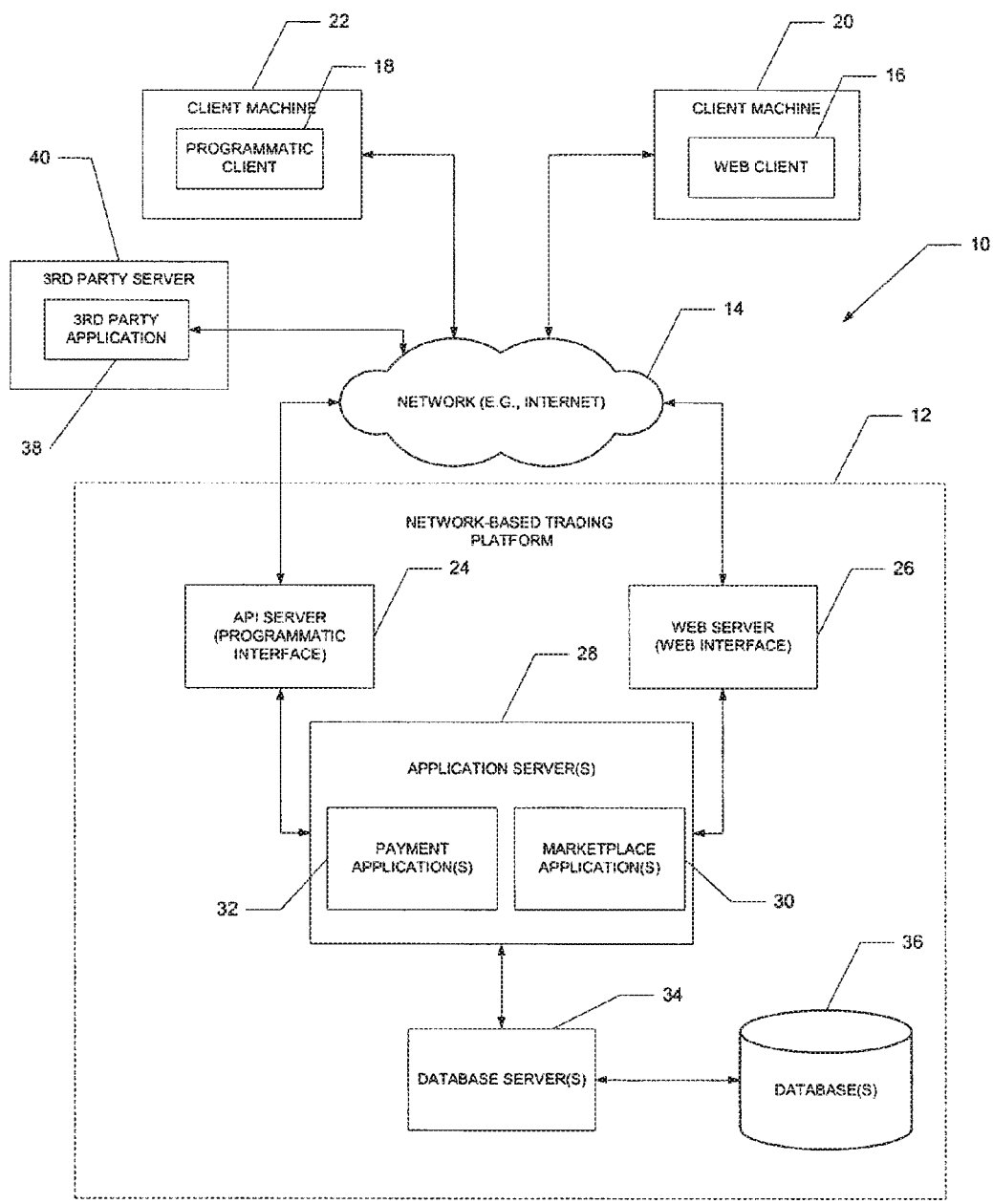
FIG. 1 is a network diagram illustrating a system, according to an exemplary embodiment of the present invention, to categorize an item in an electronic marketplace.

FIG. 1 is a network diagram depicting a system 10, according to one exemplary embodiment of the present invention, having a client-server architecture. A commerce platform, in the exemplary form of a network-based marketplace 12, provides server-side functionality, via a network 14 (e.g., the Internet) to one or more clients. FIG. 1 illustrates, for example, a web client 16 (e.g., a browser, such as the Internet Explorer browser developed by Microsoft Corporation of Redmond, Wash. State), and a programmatic client 18 executing on respective client machines 20 and 22.

Turning specifically to the network-based marketplace 12, an Application Program Interface (API) server 24 and a web server 26 are coupled to, and provide programmatic and web interfaces respectively to, one or more application servers 28. The application servers 28 host one or more marketplace applications 30 and payment applications 32. The application servers 28 are coupled to one or more databases servers 34 that facilitate access to one or more databases 36.

The marketplace applications 30 provide a number of marketplace functions and services to users that access the marketplace 12. The payment applications 32 likewise provide a number of payment services and functions to users. In one embodiment, the payment applications 30 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 1 to both form part of the network-based marketplace 12, it will be appreciated that, in alternative embodiments of the present invention, the payment applications 32 may form part of a payment service that is separate and distinct from the marketplace 12.

Further, while the system 10 shown in FIG. 1 employs a client-server architecture, the present invention is of course not limited to such an architecture, and could equally well find application in a distributed, or peer-to-peer, architecture system. The various marketplace and payment applications 30 and 32 could also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TURBOLISTER application developed by eBay Inc., of San Jose, Calif.) to enable sellers to author and manage listings on the marketplace 12 in an off-line manner, and to perform batch-mode communications between the programmatic client 18 and the network-based marketplace 12.

FIG. 1 also illustrates a third party application 38, executing on a third party server machine 40, as having programmatic access to the network-based marketplace 12 via the programmatic interface provided by the API server 24. For example, the third party application 38 may, utilizing information retrieved from the network-based marketplace 12, support one or more features or functions on a website hosted by the third party. The third party website may, for example, provide one or more promotional, marketplace or payment functions that are supported by the relevant applications of the network-based marketplace 12.

Marketplace Applications

Figure 2:
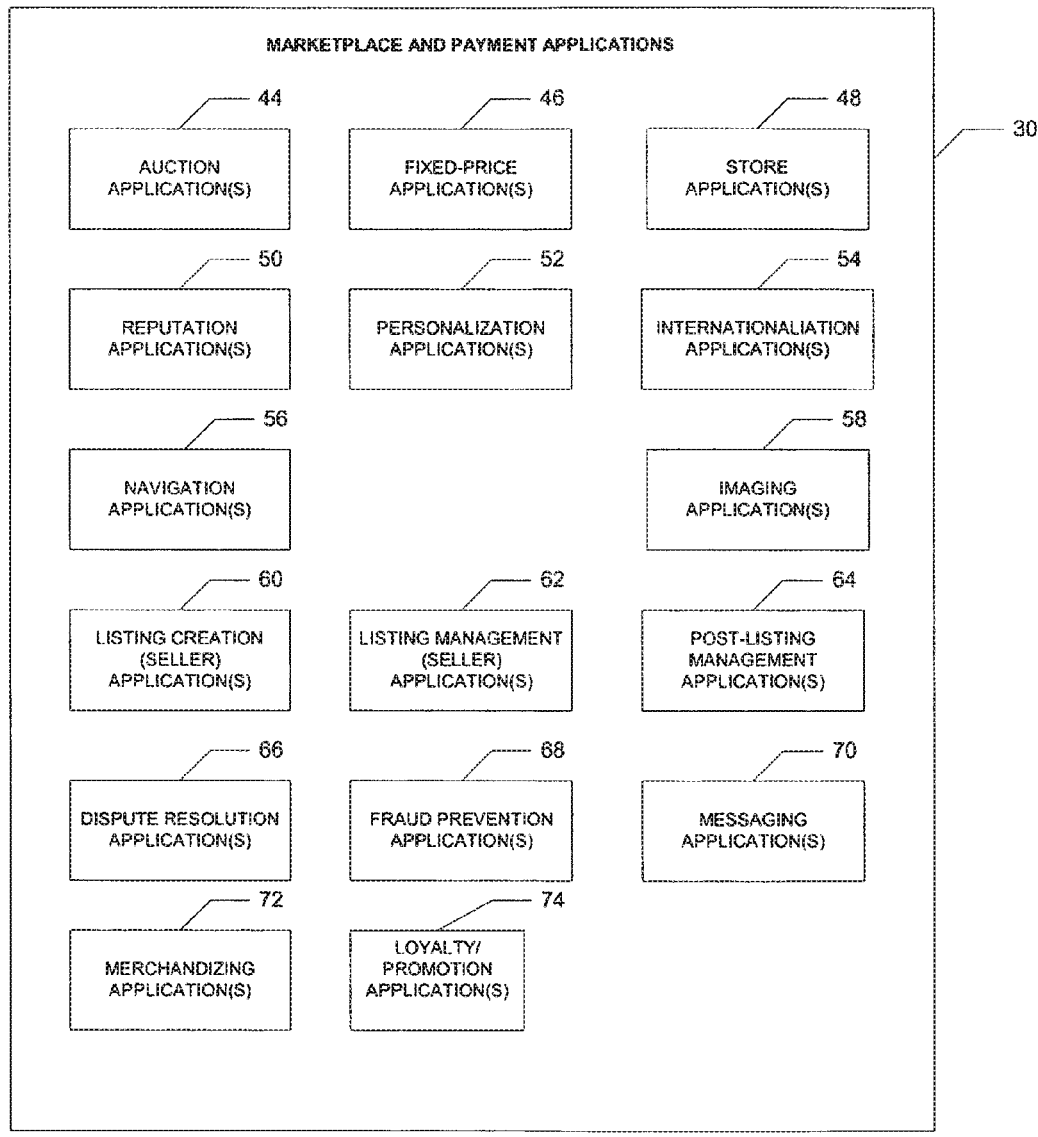
FIG. 2 is a block diagram illustrating multiple marketplace and payment applications that, in one exemplary embodiment of the present invention, are provided as part of the electronic marketplace.

FIG. 2 is a block diagram illustrating multiple marketplace and payment applications 30 that, in one exemplary embodiment of the present invention, are provided as part of the network-based marketplace 12. The marketplace 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the BUY-IT-NOW (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based marketplace 12 to establish, build and maintain reputations, which may be made available and published to potential trading partners. Consider that where, for example, the network-based marketplace 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based marketplace 12 over time. Other potential trading partners may then reference such a reputation for the purposes of assessing credibility and trustworthiness.

Personalization applications 52 allow users of the marketplace 12 to personalize various aspects of their interactions with the marketplace 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace 12 and other parties.

In one embodiment, the network-based marketplace 12 may support a number of marketplaces that are customized, for example, for specific geographic regions. A version of the marketplace 12 may be customized for the United Kingdom, whereas another version of the marketplace 12 may be customized for the United States. Each of these versions may operate as an independent marketplace, or may be customized (or internationalized) presentations of a common underlying marketplace.

Navigation of the network based-marketplace 12 may be facilitated by one or more navigation applications 56. For example, a search application enables key word searches of listings published via the marketplace 12. A browser application allows users to browse various category, catalogue, or inventory data structures according to which listings may be classified within the marketplace 12. Various other navigation applications may be provided to supplement the search and browsing applications.

In order to make listings, available via the network-based marketplace 12, as visually informing and attractive as possible, the marketplace applications 30 may include one or more imaging applications 58 which users may upload images for inclusion within listings. An imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow sellers to author conveniently listings pertaining to goods or services that they wish to transact via the marketplace 12, and listing management applications 62 allow sellers to manage such listings. Specifically, where a particular seller has authored and/or published a large number of listings, the management of such listings may present a challenge. The listing management applications 62 provide a number of features (e.g., auto-relisting, inventory level monitors, etc.) to assist the seller in managing such listings. One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller to provide feedback conveniently regarding multiple buyers to the reputation applications 50.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the marketplace 12.

Messaging applications 70 are responsible for the generation and delivery of messages to users of the network-based marketplace 12, such messages for example advising users regarding the status of listings at the marketplace 12 (e.g., providing "outbid" notices to bidders during an auction process or to provide promotional and merchandising information to users).

Merchandising applications 72 support various merchandising functions that are made available to sellers to enable sellers to increase sales via the marketplace 12. The merchandising applications 80 also operate the various merchandising features that may be invoked by sellers, and may monitor and track the success of merchandising strategies employed by sellers.

The network-based marketplace 12 itself, or one or more parties that transact via the marketplace 12, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed.

Category Management System

Figure 3:
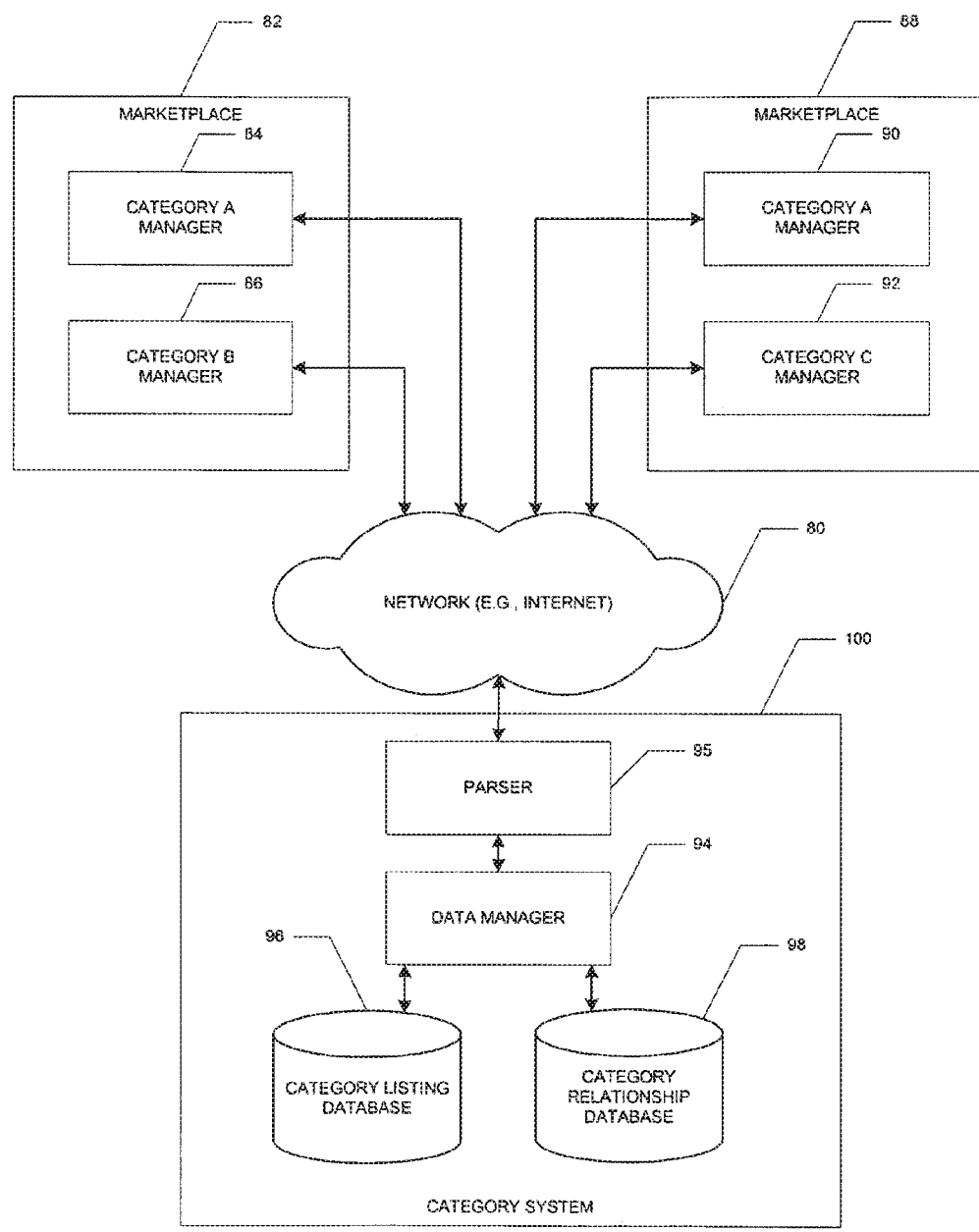
FIG. 3 is a network diagram illustrating a category system, according to an exemplary embodiment of the present invention.

FIG. 3 is a network diagram illustrating one elements of a category system 100. The category system 100 is connected to the marketplaces 82 and 88 via a network 80. Although the category system 100 and the marketplaces 82 and 88 are connected in a peer-to-peer arrangement, other network arrangements may be used.

The marketplaces 82 and 88 may provide different retail operations, such as an auction site or a virtual retail store. In addition, the marketplaces 82 and 88 may be located at different geographical areas. In one exemplary embodiment, both the marketplaces 82 and 88 provide sellers with a category listing application for the seller to list the merchandise.

Located within each marketplace 82 and 88 are category managers 84, 86, 90 and 92. Category managers 84 and 90 maintain updates for category A at site 82 and 88 respectively. Category manager 86 is dedicated to category B and category manager 92 is responsible for category C. The maintenance of the categories may include merging one category with another, deleting a category, adding a new category or renaming a category. It will be appreciated by one ordinarily skilled in the art that a category manager may maintain multiple categories instead of a single category. In addition, a single category manager, such as category managers 84, 86, 90 or 92, may be responsible for multiple sites.

The category managers 84, 86, 90 and 92 provide the updated information of the categories to the category system 100. The provision of the updated information may be performed on a periodical or real-time basis. The information includes the types of update performed on the category, such as merge, add, delete or rename. In addition, information relating to the mapping of an old category to a new category is provided to the category system 100. For example, when category A is merged with category B, the mapping of category A to category B is submitted to the category system 100.

The category system 100 includes a data manager 94 and two databases—category listing database 96 and category relationship database 98. The data manager 94 receives the updated information from the category managers 84, 86, 90 and 92 and updates the changes in the databases 96 and 98. Using the earlier example, when category A is merged with category B, the data manager 94 updates the category listing database 96 by removing category A from the category listing database 96. In addition, the data manager 94 adds the mapping of category A to category B to the category relationship database 98.

In one exemplary embodiment, an identifier is used to uniquely represent each category. The category identifier may be assigned by the category system 100 or the category managers 84, 86, 90, and 92. The category identifier may be of any data type, such as alphanumeric or special characters. When a user submits a description of the category or the product, the parser 95 of the category system 100 translates the description based on the category listing database 96 and assigns a category identifier. The category system 100 uses the category identifier to perform searches and mappings on the databases 96 and 98.

Though the exemplary embodiment of the category system 100 is illustrated as a centralized system, it is not limited to such. For example, a distributed system may be set up with a category system 100 located at each marketplace 82 and 88. Alternatively, a centralized category system 100 may be configured to record the source of the updates. For example, the centralized category system 100 is able to identify that category A is updated at site 82 but not site 88. Therefore, a seller listing an item under category A is automatically re-categorized at site 82 but not at site 88.

Interactive Flowchart

Figure 4:
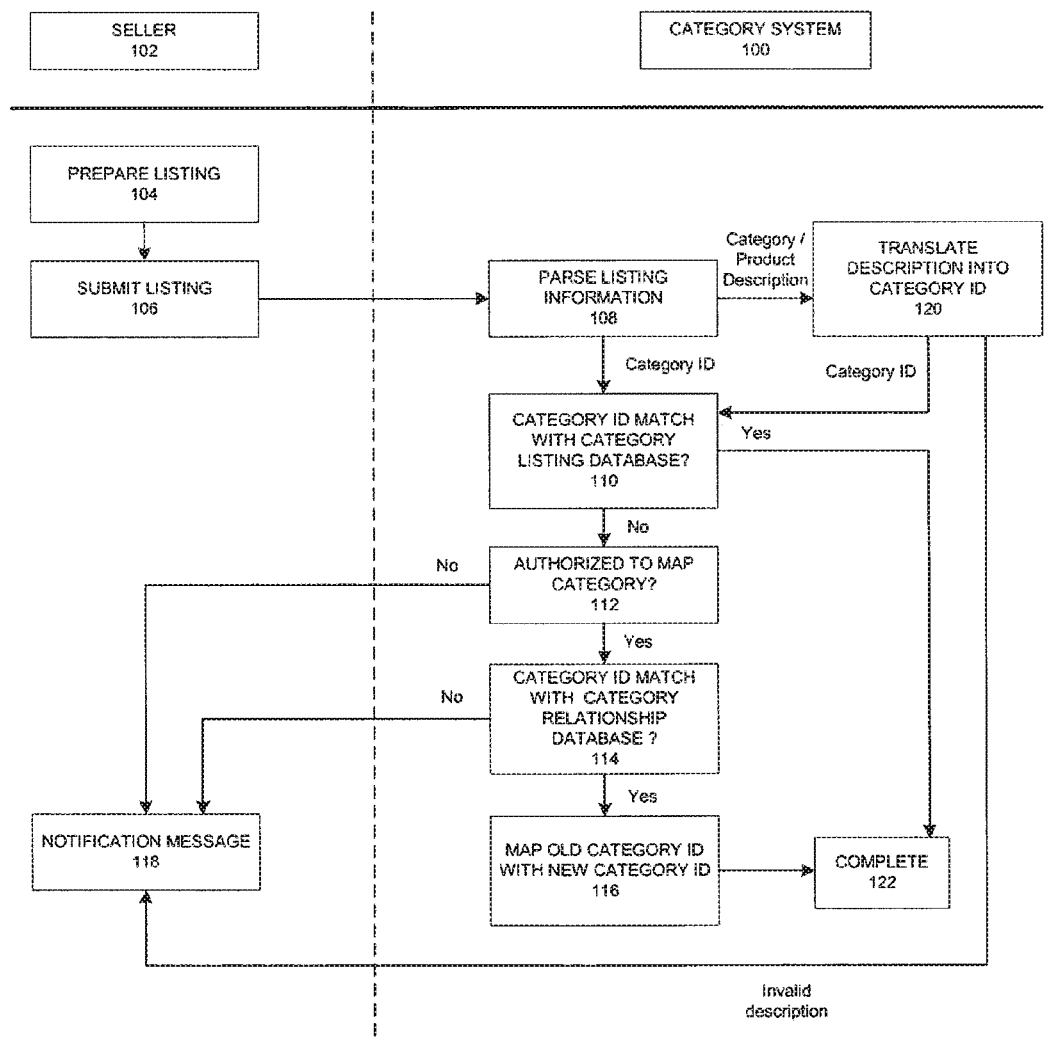
FIG. 4 is an interactive flow chart illustrating a method, according to one exemplary embodiment of the present invention, to categorize an item automatically.

FIG. 4 is an interactive flow chart illustrating a method, according to an exemplary embodiment of the present invention, to automatically categorize a merchant listing (e.g., describing an item or service available for transaction) submitted by a seller 102.

Starting at block 104, the seller 102 prepares listing information, describing an item or service that the seller may be offering for sale (or other transaction type, such as lease or rental for example) In one embodiment, the seller 102 includes information such as pricing, product description, payment mode and one or more images in the listing information. In addition, if the seller 102 is aware of the categories listed in the marketplace, the seller 102 may specify, within the listing information, the category or the category identifier of the item. Alternatively, the seller 102 may choose to let the marketplace categorize the item automatically.

The seller 102 submits the listing information to the category system 100 in the market place at block 106. At block 108, the category system 100 parses the listing information as submitted by the seller 102. In one embodiment, the seller 102 provides a category description for the item. The category system 100 translates the category description into the appropriate category identifier by performing a search on the category listing database 96 at block 120. Prior versions of the category listing database 96 may be used to locate the category identifier if the category description provided has expired.

Similarly, if the seller 102 provides a product description, the category system 100 translates the product description into the category identifier for listing at block 120.

In the event that the seller 102 has provided a category identifier, the category system 100 compares the category identifier with the identifiers in the latest version of the category listing database 96 at block 110. As the category listing database 96 contains the most up-to-date category identifier, the comparison process determines if the category identifier submitted by the seller 102 has expired. Likewise, the category identifier generated at block 120 is subject to verification at block 110.

Once the category identifier has been identified as expired, the category system 100 verifies if the seller 102 has given the category system 100 the authority to update the category identifier automatically at block 112. In one instance, the seller 102 may choose to be notified at block 118 and use other means to update the category identifier. If the category system 100 is authorized to automatically update the category identifier, the category system 100 performs a search on the category relationship database 98. Previous versions of the category relationship database 98 may be used. The category relationship database 98 contains a mapping of "old" (or previous) categories to "new" or current categories. If a match is found, the old category identifier is mapped onto a new category identifier at block 114. Following in the mapping of the old category identifier to the new category identifier, the listing information may be updated to record an association between the new category identifier and the listing. Specifically, in one embodiment, the category identifier that was previously associated with, or included in, the listing is replaced by the new category identifier as identified at block 114. In another embodiment, the new category identifier may be associated with the item as a "current" category identifier, and the "old" category identifier may be retained as a "previous" category identifier for the item. The updated listing information is then stored within a database of the electronic marketplace. The electronic marketplace then operates to publish the listing information utilizing the new category information, so that the listing may be locatable utilizing a current category hierarchy of the electronic marketplace.

Returning to the flowchart shown in FIG. 4, in the event that no match is found at block 114, the seller 102 will be notified of the error at block 116.

Category Listing Database and Category Relationship Database

FIG. 5 is a block diagram representing the data information in the category listing database 96 and the category relationship database 98. In one exemplary embodiment, as represented by block 132, the electronic marketplace has a listing of categories A, B, C and D on January 2004. The category listing database 96 contains categories A, B, C and D while the category relationship database 98 is empty.

At block 134, the electronic marketplace decides to merge category A with category B. The category system 100 removes category A from the category listing database 96 while maintaining categories B, C and D. The category relationship database 98 records the mapping of category A to category B. In one embodiment, when the seller 102 submits an item of category A, the category system 100 searches the category listing database 96 for category A. As category A is not located in the category listing database 96, the category system 100 performs another search using the category relationship database 98. The category relationship database 98 indicates that category A is now mapped to category 13. Therefore, the item is automatically listed under category B instead of category A.

In another exemplary embodiment, the electronic marketplace merges category B with category C at block 136. Similarly, the category system 100 removes category B from the category listing database 96. The category listing database 96 now contains categories C and D. In addition, the category relationship database 98 is updated to remove the mapping of category A to category B, add mappings of category A to category C and category B to category C. When a seller 102 submits an item of category A or category B, the category system 100 automatically reclassifies the item under category C.

At block 138, the electronic marketplace re-lists category A, which has previously been merged with category B. The category system 100 updates the category listing database 96 with category A and removes the mapping of category A to category C from the category relationship database 98. In the event that the seller 102 submits an item of category A for listing, the category system 100 is able to automatically list the item under category A as category A can be located in the category listing database 96.

In another exemplary embodiment, the electronic marketplace renames category A as category Z, as illustrated at block 140. The category system 100 handles the process by first deleting category A from the category listing database 96 and adding category Z. Next, the category system 100 adds the mapping of category A to category Z in the category relationship database 98. The category system 100 automatically classifies an item of category A under category Z.

System Architecture

Figure 6:
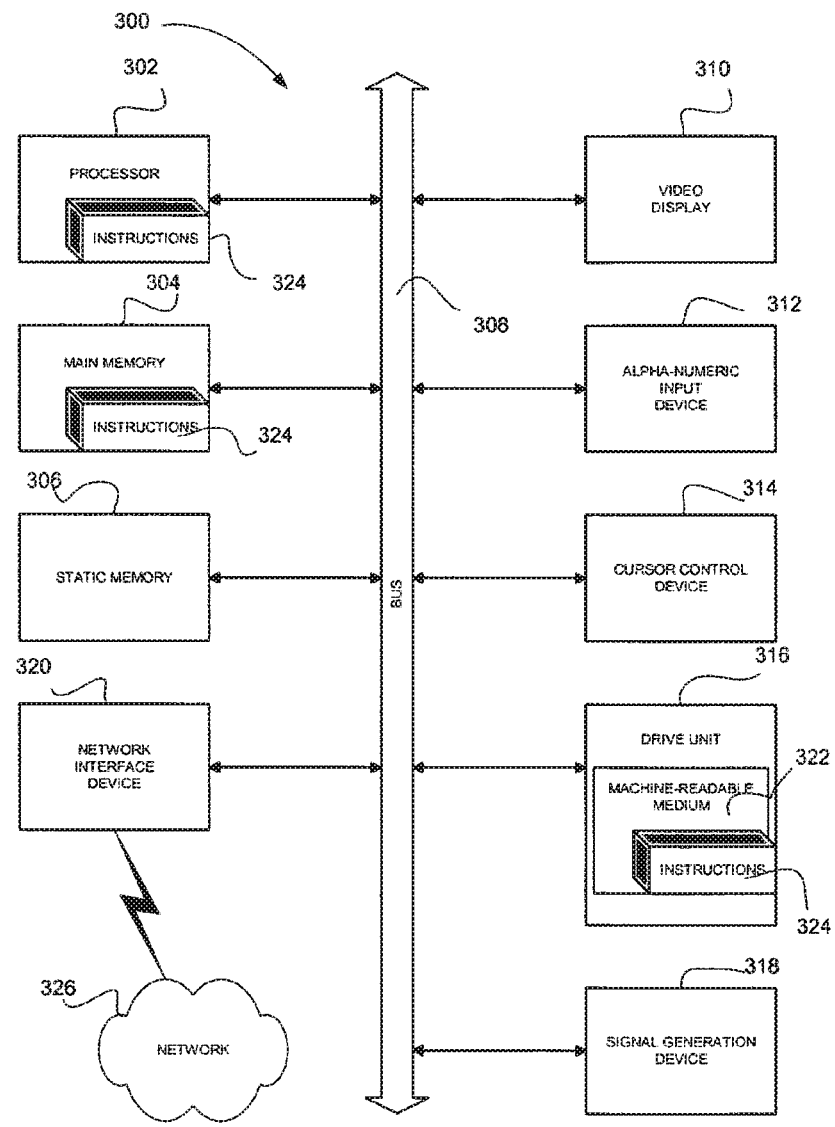
FIG. 6 is a diagrammatic representation of a machine within which a set of instructions, for causing the machine to perform any one of methods described herein, may be executed.

FIG. 6 shows a diagrammatic representation of a machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to automatically categorize merchant items in an electronic marketplace have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   communicatively coupling a network-based category system that includes a data manager, a first database of category identifiers, and a second database of category relationships to a marketplace, the marketplace publishing listings under categories managed by the network-based category system, wherein the network-based category system is communicatively coupled to a plurality of marketplaces and provides category management to each of the plurality of marketplaces;
   receiving, by the data manager of the network-based category system via a network from a category manager of the marketplace, update information to re-list a first category represented by a first category identifier, the second database of category relationships storing a mapping from the first category identifier to a second category identifier based on a previous merge of the first category with a second category represented by the second category identifier;
   responsive to receiving the update information to re-list the first category, updating the first database of category identifiers by storing the first category identifier in the first database of category identifiers;
   responsive to receiving the update information to re-list the first category, updating the second database of category relationships by removing the mapping from the first category identifier to the second category identifier from the second database of category relationships;
   subsequent to the updating of the first database and the second database, receiving, by the network-based category system, listing information including a description of an item that is associated with the first category;
   based on the listing information, automatically categorizing the item under the first category; and
   causing the marketplace to publish a listing associated with the listing information under the first category.

2. The method of claim 1, further comprising:
   parsing, by a parser of the network-based category system, the description to determine an association between the description and the first category.

3. The method of claim 1, further comprising:
   recording a source of the update information to re-list the first category, the source being the category manager of the marketplace, wherein the updating of the first database and the second database is performed with respect to the marketplace and not performed for any other marketplace of the plurality of marketplaces.

4. The method of claim 3, wherein the automatically categorizing the item under the first category occurs at the marketplace but does not occur at any other marketplace of the plurality of marketplaces.

5. The method of claim 1, wherein the network-based category system is located within the marketplace.

6. The method of claim 1, further comprising:
   receiving an indication to rename the first category identifier as a third category identifier;
   responsive to receiving the indication to rename the first category identifier:
      removing the first category identifier from the first database of category identifiers, adding the third category identifier to the first database of category identifiers, and adding a mapping of the first category identifier to the third category identifier to the second database of category relationships; and
      based on the mapping, automatically classifying items under the first category identifier as under the third category identifier.

7. The method of claim 6, wherein the indication to rename the first category identifier as the third category identifier is received in response to the first category identifier expiring.

8. The method of claim 6, wherein the indication to rename the first category identifier as the third category identifier is received in response to a user selection.

9. A system comprising:
at least one processor of a machine; and
a memory storing instructions that, when executed by the at least one processor, cause the machine to perform operations comprising:
communicatively coupling a network-based category system that includes a data manager, a first database of category identifiers, and a second database of category relationships to a marketplace, the marketplace publishing listings under categories managed by the network-based category system, wherein the network-based category system is communicatively coupled to a plurality of marketplaces and provides category management to each of the plurality of marketplaces;
receiving, by the data manager of the network-based category system via a network from a category manager of the marketplace, update information to re-list a first category represented by a first category identifier, the second database of category relationships storing a mapping from the first category identifier to a second category identifier based on a previous merge of the first category with a second category represented by the second category identifier;
responsive to receiving the update information to re-list the first category, updating the first database of category identifiers by storing the first category identifier in the first database of category identifiers;
responsive to receiving the update information to re-list the first category, updating the second database of category relationships by removing the mapping from the first category identifier to the second category identifier from the second database of category relationships;
subsequent to the updating of the first database and second database, receiving, by the network-based category system, listing information including a description of an item that is associated with the first category;
based on the listing information, automatically categorizing the item under the first category; and
causing the marketplace to publish a listing associated with the listing information under the first category.

10. The system of claim 9, wherein the operations further comprise:
parsing the description to determine an association between the description and the first category.

11. The system of claim 9, wherein the operations further comprise:
recording a source of the update information to re-list the first category, the source being the category manager of the marketplace, wherein the updating of the first database and the second database is performed with respect to the marketplace and not performed for any other marketplace of the plurality of marketplaces.

12. The system of claim 9, wherein each of the plurality of marketplaces is located in a different geographic region.

13. The system of claim 9, wherein the network-based category system is located within the marketplace.

14. The system of claim 9, wherein the operations further comprise:
receiving an indication to rename the first category identifier as a third category identifier;
responsive to receiving the indication to rename the first category identifier:
removing the first category identifier from the first database of category identifiers, adding the third category identifier to the first database of category identifiers, and adding a mapping of the first category identifier to the third category identifier; and
based on the mapping, automatically classifying items under the first category identifier as under the third category identifier.

15. The system of claim 14, wherein the indication to rename the first category identifier as the third category identifier is received in response to the first category identifier expiring.

16. The system of claim 14, wherein the indication to rename the first category identifier as the third category identifier is received in response to a user selection.

17. A non-transitory machine-readable storage medium comprising instructions that, when executed by one or more processors of a machine, cause the machine to perform operations comprising:
communicatively coupling a network-based category system that includes a data manager, a first database of category identifiers, and a second database of category relationships to a marketplace, the marketplace publishing listings under categories managed by the network-based category system, wherein the network-based category system is communicatively coupled to a plurality of marketplaces and provides category management to each of the plurality of marketplaces;
receiving, by the data manager of the network-based category system via a network from a category manager of the marketplace, update information to re-list a first category represented by a first category identifier, the second database of category relationships storing a mapping from the first category identifier to a second category identifier based on a previous merge of the first category with a second category represented by the second category identifier;
responsive to receiving the update information to re-list the first category, updating the first database of category identifiers by storing the first category identifier in the first database of category identifiers;
responsive to receiving the update information to re-list the first category, updating the second database of category relationships by removing the mapping from the first category identifier to the second category identifier from the second database of category relationships;
subsequent to the updating of the first database and second database, receiving, by the network-based category system, listing information including a description of an item that is associated with the first category;
based on the listing information, automatically categorizing the item under the first category; and
causing the marketplace to publish a listing associated with the listing information under the first category.

18. The non-transitory machine-readable storage medium of claim 17, wherein the operations further comprise:
parsing the description to determine an association between the description and the first category.

* * * * *